United States Patent
Beaurepaire et al.

(10) Patent No.: US 9,503,556 B2
(45) Date of Patent: Nov. 22, 2016

(54) HANDLING VOICE CALLS

(71) Applicant: HERE Global B.V., Veldhoven (NL)

(72) Inventors: Jerome Beaurepaire, Berlin (DE);
Philippe Beaurepaire, Tregomar (FR)

(73) Assignee: HERE GLOBAL B.V., Veldhoven (NL)

( * ) Notice: Subject to any disclaimer, the term of this patent is extended or adjusted under 35 U.S.C. 154(b) by 0 days.

(21) Appl. No.: 14/898,692

(22) PCT Filed: Jun. 18, 2013

(86) PCT No.: PCT/EP2013/062603
§ 371 (c)(1),
(2) Date: Dec. 15, 2015

(87) PCT Pub. No.: WO2014/202122
PCT Pub. Date: Dec. 24, 2014

(65) Prior Publication Data
US 2016/0156761 A1    Jun. 2, 2016

(51) Int. Cl.
*H04M 3/42*      (2006.01)
*H04M 1/725*     (2006.01)
(Continued)

(52) U.S. Cl.
CPC .......... *H04M 1/72519* (2013.01); *G10L 25/78* (2013.01); *H04M 1/575* (2013.01); *G10L 2025/783* (2013.01); *H04M 1/72583* (2013.01); *H04M 2250/12* (2013.01)

(58) Field of Classification Search
CPC ........... H04M 1/72519; H04M 1/575; H04M 1/72583; H04M 2250/12; G10L 25/78; G10L 2025/783
USPC ...................................................... 455/414.1
See application file for complete search history.

(56) References Cited

U.S. PATENT DOCUMENTS 5,224,151 A * 6/1993 Bowen ................ H04M 1/6016
                                                340/524
5,278,944 A    1/1994 Sasaki et al.
(Continued)

FOREIGN PATENT DOCUMENTS

EP           1773040 A1      4/2007

OTHER PUBLICATIONS

International Preliminary Report on Patentability for International Application No. PCT/EP2013/062603, issued Dec. 22, 2015, 1 Page.
(Continued)

*Primary Examiner* — Marcus Hammonds
(74) *Attorney, Agent, or Firm* — Ditthavong & Steiner, P.C.

(57) ABSTRACT

Apparatus has at least one processor and at least one memory having computer-readable code stored thereon which when executed controls the at least one processor to perform a method comprising:
  whilst providing two-way communication in a voice call, detecting whether a speaker component of a voice communications device is in a state of being moved away from a user's ear;
  in response to detecting that the speaker component of the voice communications device is in a state of being moved away from a user's ear, entering a line activity mode;
  in the line activity mode, determining whether voice activity is present on the inbound channel of the voice call; and
  in response to determining the presence of voice activity on the inbound channel of the call when in the line activity mode, causing announcement of the detection of voice activity.

17 Claims, 3 Drawing Sheets

(51) Int. Cl.
*H04M 1/57* (2006.01)
*G10L 25/78* (2013.01)

(56) References Cited

U.S. PATENT DOCUMENTS 7,881,450 B1* 2/2011 Gentle ................ H04M 3/4286
379/211.03
8,331,545 B2* 12/2012 Lingafelt ............ H04L 12/1831
379/202.01
2002/0176546 A1* 11/2002 Dietz .................... H04M 1/656
379/67.1
2013/0190057 A1* 7/2013 Sahu ..................... G06F 1/1694
455/566
2014/0195252 A1* 7/2014 Gruber ................... G10L 15/22
704/275

OTHER PUBLICATIONS

Written Opinion of the International Searching Authority for International Application No. PCT/EP2013/062603, issued Dec. 22, 2015, 6 Pages.

* cited by examiner

Fig. 3 and# HANDLING VOICE CALLS

RELATED APPLICATION

The present application is a national phase application of PCT Application No. PCT/EP2013/062603, filed Jun. 18, 2013, the entire contents of which are herein incorporated by reference.

FIELD OF THE INVENTION

This specification relates generally to handling voice calls.

BACKGROUND TO THE INVENTION

It is now common for portable devices, such as mobile phones, to be provided with a range of sensors and/or sophisticated processing capabilities, providing opportunities for improving the experience of users.

SUMMARY OF EMBODIMENTS OF THE INVENTION

A first aspect of the specification provides apparatus, the apparatus having at least one processor and at least one memory having computer-readable code stored thereon which when executed controls the at least one processor to perform a method comprising:
  whilst providing two-way communication in a voice call, detecting whether a speaker component of a voice communications device is in a state of being moved away from a user's ear;
  in response to detecting that the speaker component of the voice communications device is in a state of being moved away from a user's ear, entering a line activity mode;
  in the line activity mode, determining whether voice activity is present on the inbound channel of the voice call; and
  in response to determining the presence of voice activity on the inbound channel of the call when in the line activity mode, causing announcement of the detection of voice activity.

The computer-readable code when executed may control the at least one processor to perform:
  causing announcement of the detection of voice activity by causing display of a warning message indicating the presence of voice activity on the inbound channel of the call.

The computer-readable code when executed may control the at least one processor to perform:
  causing announcement of the detection of voice activity by causing a haptic announcement to be made.

The computer-readable code when executed may control the at least one processor to perform:
  detecting whether a speaker component of a voice communications device is in a state of being moved away from a user's ear by detecting an amount of movement exceeding a threshold amount.

The computer-readable code when executed may control the at least one processor to perform:
  detecting whether a speaker component of a voice communications device is in a state of being moved away from a user's ear by analysing signals provided by a proximity sensor arrangement.

The computer-readable code when executed may control the at least one processor to perform:
  detecting whether a speaker component of a voice communications device is in a state of being moved away from a user's ear by analysing signals provided by an accelerometer arrangement.

The computer-readable code when executed may control the at least one processor to perform:
  detecting whether a speaker component of a voice communications device is in a state of being moved away from a user's ear by analysing signals provided by a touch screen arrangement.

The computer-readable code when executed may control the at least one processor to perform:
  detecting whether a speaker component of a voice communications device is in a state of being moved away from a user's ear by analysing signals provided by a hover-sensitive touch screen arrangement.

The computer-readable code when executed may control the at least one processor to perform:
  determining the presence of voice activity on the inbound channel of the voice call by determining that a sound level on the inbound channel exceeds a threshold sound level.

The computer-readable code when executed may control the at least one processor to perform:
  determining the presence of voice activity on the inbound channel of the voice call by determining that a sound level of speech content on the inbound channel exceeds a threshold amount.

The computer-readable code when executed may control the at least one processor to perform:
  determining the presence of voice activity on the inbound channel of the voice call by performing speech analysis on speech content on the inbound channel and determining that a predetermined phrase is present.

The apparatus may comprises the voice communications device.

The voice communications device may comprise a portable voice communications device.

The voice communications device may comprise a portable voice communications device comprising only one housing.

A second aspect of the invention provides a method comprising:
  whilst providing two-way communication in a voice call, detecting whether a speaker component of a voice communications device is in a state of being moved away from a user's ear;
  in response to detecting that the speaker component of the voice communications device is in a state of being moved away from a user's ear, entering a line activity mode;
  in the line activity mode, determining whether voice activity is present on the inbound channel of the voice call; and
  in response to determining the presence of voice activity on the inbound channel of the call when in the line activity mode, causing announcement of the detection of voice activity.

The method may comprise: causing announcement of the detection of voice activity by causing display of a warning message indicating the presence of voice activity on the inbound channel of the call.

The method may comprise: causing announcement of the detection of voice activity by causing a haptic announcement to be made.

The method may comprise: detecting whether a speaker component of a voice communications device is in a state of being moved away from a user's ear by detecting an amount of movement exceeding a threshold amount.

The method may comprise: detecting whether a speaker component of a voice communications device is in a state of being moved away from a user's ear by analysing signals provided by a proximity sensor arrangement.

The method may comprise: detecting whether a speaker component of a voice communications device is in a state of being moved away from a user's ear by analysing signals provided by an accelerometer arrangement.

The method may comprise: detecting whether a speaker component of a voice communications device is in a state of being moved away from a user's ear by analysing signals provided by a touch screen arrangement.

The method may comprise: detecting whether a speaker component of a voice communications device is in a state of being moved away from a user's ear by analysing signals provided by a hover-sensitive touch screen arrangement.

The method may comprise: determining the presence of voice activity on the inbound channel of the voice call by determining that a sound level on the inbound channel exceeds a threshold sound level, or determining the presence of voice activity on the inbound channel of the voice call by determining that a sound level of speech content on the inbound channel exceeds a threshold amount, or determining the presence of voice activity on the inbound channel of the voice call by performing speech analysis on speech content on the inbound channel and determining that a predetermined phrase is present.

The method may be performed by the voice communications device. The voice communications device may comprises a portable voice communications device. The voice communications device may comprise a portable voice communications device comprising only one housing.

Another aspect of the invention provides a computer program comprising machine readable instructions that when executed by computing apparatus controls it to perform a method above.

A third aspect of the invention provides a non-transitory computer-readable storage medium having stored thereon computer-readable code, which, when executed by computing apparatus, causes the computing apparatus to perform a method comprising:
  whilst providing two-way communication in a voice call, detecting whether a speaker component of a voice communications device is in a state of being moved away from a user's ear;
  in response to detecting that the speaker component of the voice communications device is in a state of being moved away from a user's ear, entering a line activity mode;
  in the line activity mode, determining whether voice activity is present on the inbound channel of the voice call; and
  in response to determining the presence of voice activity on the inbound channel of the call when in the line activity mode, causing announcement of the detection of voice activity.

The computer-readable code when executed may cause the computing apparatus to perform:
  causing announcement of the detection of voice activity by causing display of a warning message indicating the presence of voice activity on the inbound channel of the call.

The computer-readable code when executed may cause the computing apparatus to perform:
  causing announcement of the detection of voice activity by causing a haptic announcement to be made.

The computer-readable code when executed may cause the computing apparatus to perform:
  detecting whether a speaker component of a voice communications device is in a state of being moved away from a user's ear by detecting an amount of movement exceeding a threshold amount.

The computer-readable code when executed may cause the computing apparatus to perform:
  detecting whether a speaker component of a voice communications device is in a state of being moved away from a user's ear by analysing signals provided by a proximity sensor arrangement.

The computer-readable code when executed may cause the computing apparatus to perform:
  detecting whether a speaker component of a voice communications device is in a state of being moved away from a user's ear by analysing signals provided by an accelerometer arrangement.

The computer-readable code when executed may cause the computing apparatus to perform:
  detecting whether a speaker component of a voice communications device is in a state of being moved away from a user's ear by analysing signals provided by a touch screen arrangement.

The computer-readable code when executed may cause the computing apparatus to perform:
  detecting whether a speaker component of a voice communications device is in a state of being moved away from a user's ear by analysing signals provided by a hover-sensitive touch screen arrangement.

The computer-readable code when executed may cause the computing apparatus to perform:
  determining the presence of voice activity on the inbound channel of the voice call by determining that a sound level on the inbound channel exceeds a threshold sound level.

The computer-readable code when executed may cause the computing apparatus to perform:
  determining the presence of voice activity on the inbound channel of the voice call by determining that a sound level of speech content on the inbound channel exceeds a threshold amount.

The computer-readable code when executed may cause the computing apparatus to perform:
  determining the presence of voice activity on the inbound channel of the voice call by performing speech analysis on speech content on the inbound channel and determining that a predetermined phrase is present.

The computing apparatus may comprise the voice communications device, which may for example be a portable voice communications device or a portable voice communications device comprising only one housing.

A fourth aspect of the invention provides apparatus comprising:
  means for, whilst providing two-way communication in a voice call, detecting whether a speaker component of a voice communications device is in a state of being moved away from a user's ear;
  means for, in response to detecting that the speaker component of the voice communications device is in a state of being moved away from a user's ear, entering a line activity mode;

means for, in the line activity mode, determining whether voice activity is present on the inbound channel of the voice call; and means for, in response to determining the presence of voice activity on the inbound channel of the call when in the line activity mode, causing announcement of the detection of voice activity.

A fifth aspect of the invention provides apparatus configured:

whilst providing two-way communication in a voice call, to detect whether a speaker component of a voice communications device is in a state of being moved away from a user's ear;

in response to detecting that the speaker component of the voice communications device is in a state of being moved away from a user's ear, to enter a line activity mode;

in the line activity mode, to determine whether voice activity is present on the inbound channel of the voice call; and in response to determining the presence of voice activity on the inbound channel of the call when in the line activity mode, to cause announcement of the detection of voice activity.

BRIEF DESCRIPTION OF THE DRAWINGS

Embodiments will now be described, by way of example only, with reference to the accompanying drawings, in which.

DETAILED DESCRIPTION OF EMBODIMENTS OF THE INVENTION

Figure 1:
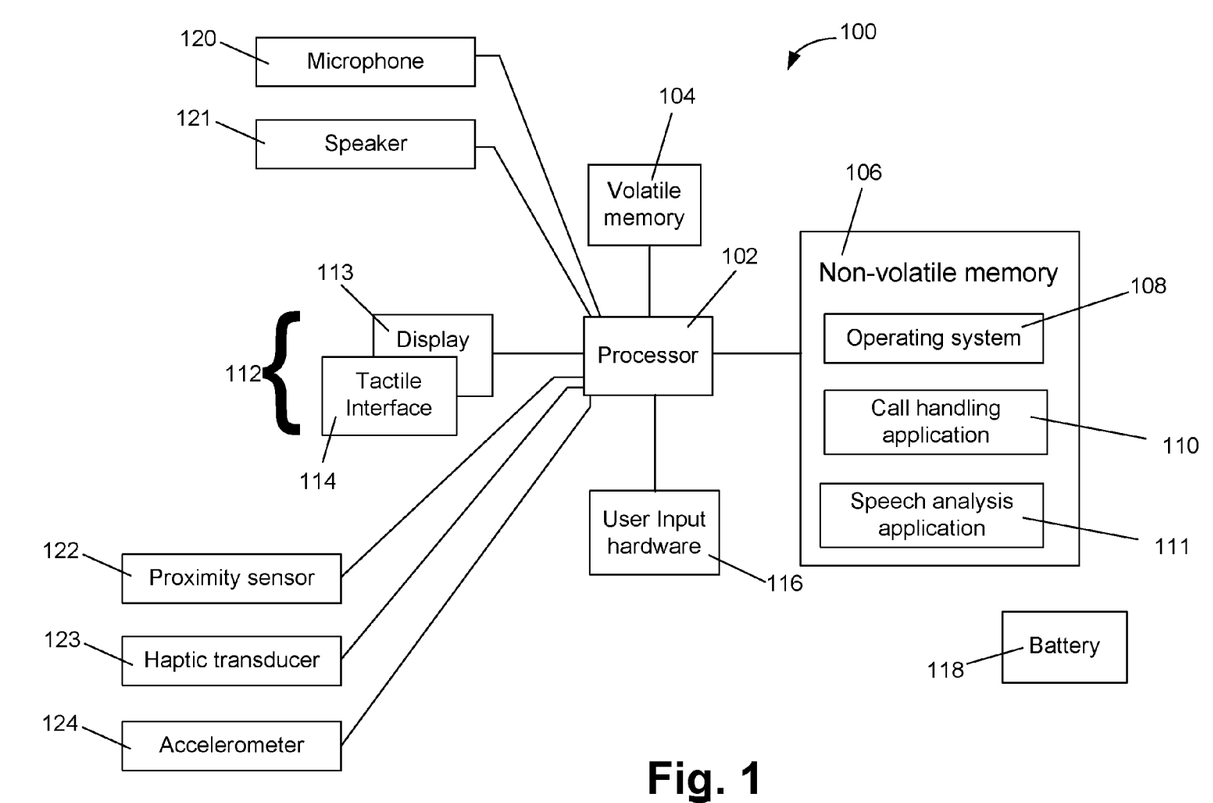
FIG. 1 is a block diagram of internal components of a terminal according to aspects of the invention.

Referring firstly to FIG. 1, a block diagram illustrating internal components of a terminal 100 is shown. The terminal includes a processor 102. The processor 102 controls operation of the other hardware components of the terminal 100. The processor 102 and other hardware components may be connected via a system bus (not shown). Each hardware component may be connected to the system bus either directly or via an interface. The terminal comprises working or volatile memory, such as Random Access Memory (RAM), 104 and a non-volatile memory 106, such as read only memory (ROM) or Flash memory. The non-volatile memory 106 stores an operating system 108 and various software applications including a call handling application 110, and a speech analysis application 111. The non-volatile memory 106 also stores data files and associated metadata. The terminal comprises a display 112. The display may be a touch sensitive display having a display part 113 and a tactile interface part 114. The terminal may comprise one or more examples of user input hardware 116, such as hardware keys. The terminal 100 also houses a battery 118 to power the terminal 100.

The processor 102 is configured to send and receive signals to and from the other components in order to control operation of the other components. For example, the processor 102 controls the display of content on display 112 and receives signals as a result of user inputs from tactile interface 114. The display 112 may be a resistive touch screen or capacitive touch screen of any kind. The display may alternatively not be a touch screen. For instance it may be a liquid crystal display (LCD) or organic light emitting diode (OLED) display. It may alternatively be a near-eye display, such as is found in a wearable computer in the form of spectacles or glasses.

The user input hardware 116 may refer to hardware keys and may also include a QWERTY or numeric keypad, etc. The user input hardware 116 may include accessory input hardware such as an input pen, external touchpad, etc. The user input hardware 116 functions in addition to the touch sensitive display 112, which also receives user inputs.

The terminal 100 includes a number of other hardware features. These include a microphone arrangement 120 and a speaker arrangement 121. Also provided is a proximity sensor arrangement 122, which may take any suitable form. A haptic transducer 123 is provided. The haptic transducer 123 is for example a transducer that can provide mechanical vibration in response to electrical signal input. An accelerometer arrangement 124 is provided.

Each of the microphone 120, the speaker 121, proximity sensor 122, the haptic transducer 123 and the accelerometer 124 are connected to the processor 102. Connection may be made in any suitable way, and typically involves a hardware interface and driver software.

The terminal 100 may be a mobile phone, PDA or tablet computer of any kind. Other standard or optional components of the terminal 100, such as transceivers and cameras, are omitted from the Figure. The processor 102 may be an integrated circuit of any kind. The processor 102 may access volatile memory 104 in order to process data and may control the storage of data in memory 106. Memory 106 may be a non-volatile memory of any kind such as a Read Only Memory (ROM), a Flash memory or a magnetic drive memory. Other non-volatile memories may be included, but are omitted from the Figure. The volatile memory 104 may be a RAM of any type, for example Static RAM (SRAM), Dynamic RAM (DRAM), or it may be Flash memory. Multiple volatile memories 104 may be included, but are omitted from the Figure.

The processor 102 may for instance be a general purpose processor. It may be a single core device or a multiple core device. The processor 102 may be a central processing unit (CPU) or a general processing unit (GPU). Alternatively, it may be a more specialist unit, for instance a RISC processor or programmable hardware with embedded firmware. Multiple processors 102 may be included. The processor 102 may be termed processing means.

The processor 102 operates under control of the operating system 108. The operating system 108 may comprise code (i.e. drivers) relating to hardware such as the display 112 and user inputs 116, as well as code relating to the basic operation of the terminal 100. The operating system 108 may also cause activation of other software modules stored in the memory 106, such as the call handling application 110 and the text analysis application 111. Generally speaking, the processor 102 executes one or more applications 110, 111 using the operating system 108, both of which are stored permanently or semi-permanently in the non-volatile memory 106, using the volatile memory 104 temporarily to store software forming a whole or part of the operating system 108 and the applications 110, 111 and also temporarily to store data generated during execution of the software.

Operation of the terminal 100 will now be described with reference to the flow chart of FIG. 2. In the following, actions said to be made by the terminal typically are made by the processor 102 operating according to instructions provided by the software of the call handling application 110 and/or the operating system 108.

The operation starts at step S1.

At step S2, the terminal 100 enters a two-way voice call. This step may be performed conventionally, so will not be described in detail. In brief, a two-way voice call can be entered either by the user of the terminal making an outgoing call, which is then answered, or by an incoming call being answered on the terminal 100.

At step S3, the two-way voice call is provided by the terminal 100. This involves the call handling application 110, and may be performed in any suitable manner.

At step S4, it is determined whether the speaker 121 is being moved away from the ear of the user. This step may be performed in any suitable way, and a number of options are provided below. For example, the processor 102 may analyse signals provided by the proximity sensor 122 to determine whether the sensor 122 is greater than a predetermined distance from an object (the user's head) and whether the distance is increasing, and on a positive determination on both conditions determine that the speaker 121 is being moved away from the ear of the user.

In the event of a negative determination from step S4, the operation returns to step S3, where the two-way voice call is continued to be provided.

If at step S4 it is determined that the speaker 121 is being moved away from the user's ear, the terminal 100 enters a line activity mode at step S5. In the line activity mode, the terminal 100 is configured to detect whether the party at the other end of the voice call still is talking. If they are talking and the speaker 121 has been moved away from the user's ear, the user may not hear the other party to the call and thus may not know that the other party wishes to continue the conversation. The terminal 100 includes features that reduce the possibility that the user of the terminal 100 ends the call when actually they would want to continue the call had they known that the other party was still talking.

Following step S5, it is determined at step S6 whether there is voice activity present on the inbound channel of the two-way voice call. This can be performed in any suitable way, and a number of options are given below. For example, the processor 102 may determine from audio on the inbound call whether a voice signal forming part of the audio averaged over a short period of time exceeds a threshold level.

If it is determined at step S6 that voice activity is present on the inbound channel, at step S7 the presence of voice activity is announced by the terminal 100. The announcement can be provided by the terminal for instance by providing an alert using the haptic transducer 123. The haptic alert may take any suitable form. It may for instance be a continuous alert or may be an intermittent alert. It may alternatively be a single alert of a fixed duration, for instance 0.5 seconds. The haptic alert may also be local, in which case it is felt by a user only at a certain location on the housing of the terminal, or global, in which case it can be felt by a user at any point on the housing of the terminal.

Figure 3:
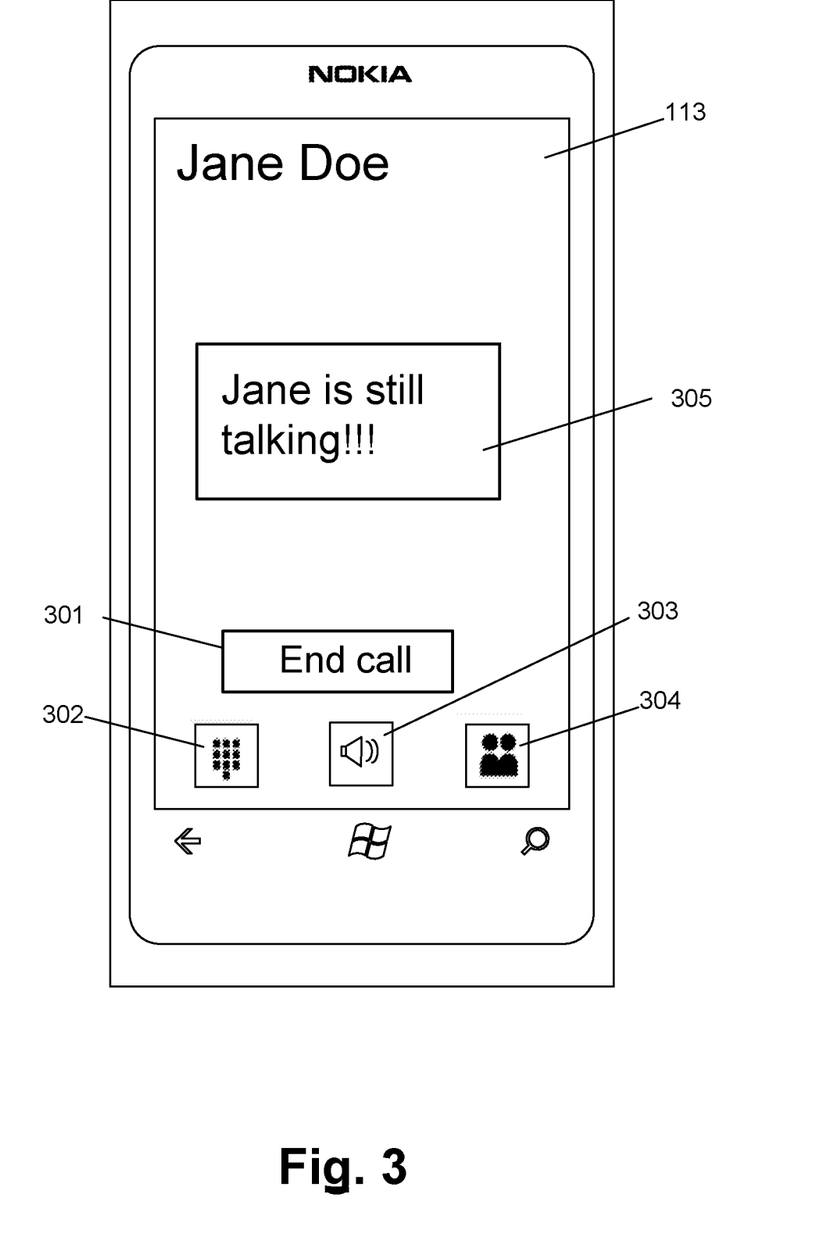
FIG. 3 shows a screen configurations which the terminal may be controlled to display.

Alternatively or additionally, the announcement may be in the form of a displayed announcement. For instance, the terminal 100 may provide on the display user interface output provided on the display 113 by the call handling application 110 text and/or graphical content indicating that there is voice activity on the inbound channel of the voice call. For instance, the call handling application 110 may cause the screenshot shown in FIG. 3 to be provided on the display 113. Here, the call handling application 110 provides a user interface including a number of virtual buttons. These include an end call button 301, an access dialler button 302, a speaker mode button 303, and a contacts button 304. The screenshot provided in FIG. 3 also includes the name of the party at the other end of the call at the top part of the display. Also shown is a graphical element 305 that includes the announcement. Here, the graphical element 305 is in the form of a pop-up box or overlay. Provided within the pop-up box or overlay 305 is some text that allows the user to determine that the other party to the call is still talking, or put another way that there is still voice activity on the inbound channel of the call. In this example, the text is "Jane is still talking!!!", although of course it could take any other suitable form.

The announcement of voice activity on the inbound channel continues until either the call is ended, until the line activity mode is exited or until it is determined that there is no longer any voice activity present on the inbound channel In particular, after step S7 it is determined at step S8 whether the speaker 121 is again against the ear of the user of the terminal 100. If at step S8 it is determined that the speaker is again against the ear of the user, line activity mode is exited at step S9, and the terminal 100 returns to continue providing the call at step S3.

If at step S8 it is determined that the speaker is not against the ear again, the operation progresses to step S10. Here, the terminal 100 determines whether a call end command has been received. This can be provided either by the user selecting the end call button 301 from FIG. 3, or by the network providing a command indicating that the other party to the call has ended the call, or that the network itself has ended the call. On a negative determination from step S10, so when a call end command has not been received, the operation returns to step S6, where it is again determined whether voice activity is present on the inbound channel.

A negative determination from step S6 also causes the operation to proceed to step S10, where it is determined whether a call end command has been received.

If at step S10 it is determined that a call end command has been received, the terminal 100 ends the call at step S11.

The effect of the operation of the terminal 100 as shown in and described with reference to FIG. 2 will now be described in some detail.

The terminal 100 is configured to determine, whilst in a two-way voice call with another party, whether the speaker 121 of the terminal 100 is being moved away from the ear of the user. When this is detected, the terminal 100 enters line activity mode.

When in the line activity mode, the terminal 100 determines whether there is voice activity on the inbound channel of the call, and announces voice activity to the user if activity is detected. This announcement allows the user of the terminal 100 to ascertain that the other party to the call is still talking, indicating that the other party either does not wish to end the call or has changed their mind about the call being ended.

Whereas conventionally the user of the terminal 100 would not be aware that the other party had again started talking after the parties had agreed to end the call, using the above-described features the user of the terminal 100 can be made aware of the fact that the other party is talking, even if the other party cannot be heard through the speaker 121 because the speaker is too far from the user's ear and/or because there is too much background noise.

After the announcement at step S7 of voice activity on the inbound channel, the user of the terminal 100 has two options. The first option is to end the call in any case, for instance by selecting the end call button 301 on the display of FIG. 3. The other option is to resume the call, by moving the terminal 100, and in particular the speaker 121, back to their ear. Once the terminal 100 is again against the user's ear, the call is continued, without having been ended in the interim, and the conversation between the parties can be resumed.

In the scenario where the parties to a call have agreed to end the call, either explicitly or implicitly, and one party changes their mind shortly afterwards, for instance because they remembered something else that they wanted to discuss, the call may be continued, i.e. it may not be ended. Conventionally, the user of the terminal 100 would not normally have been able to determine that the other party wanted to continue the call, and the user of the terminal 100 would normally have ended the call. In such a situation, the other party to the call would normally place another call, in order to discuss what they remembered that they wanted to discuss. As such, with the conventional arrangement, this scenario would require the making of two separate calls. With the arrangement of the embodiments of this invention, the second call can be avoided, and instead the first call can be extended. This is technically advantageous because the setting up of a call over a telephone network presents a greater burden on the various hardware and software resources, including those of the terminals 100 at both ends of the call as well as the intervening telephone network or networks, than does continuing a call that is already in place. Thus, the features of the embodiments described above provide a technical advantage in that in some circumstances (i.e. the circumstances described above) the setting up of a second call can be avoided altogether.

If after entering line activity mode no voice activity is determined to be present on the inbound channel, which will be the situation where the other party to the call does not indicate that they want to continue the call, the call can be ended at step S11 in response to the user of the wireless terminal 100 indicating that the call is to be ended, for instance using the end call button 301, or by the call being ended by the other party to the call or by the network.

A number of options for detecting whether the speaker 121 is being moved away from the ear of the user, which is required by step S4 of FIG. 2, will now be described.

In a first option, the proximity sensor 122 is involved. In particular, the processor 102 is configured to examine signals provided by the proximity sensor and to determine a condition where the proximity to an object (in this case the user's ear, since the terminal 100 is involved in a two-way voice call) is decreasing (that is the object is getting further away) and the proximity exceeds a threshold (that is the object is at least a predetermined distance from the sensor 122).

Alternatively, in the case of using a hover touch screen or a 3D touch sensor as the tactile interface 114, the tactile interface 114 may be used to determine that the speaker 121 is being moved away from the user's ear. In particular, the detection may be performed by determining whether the same conditions described above with respect to the proximity sensor 122 are in place. With a hover touch screen or a 3D touch sensor as the tactile interface 114, the processing performed by the processor 102 is a little different to the situation where a proximity sensor 122 is used, although the principles are similar.

In a third option, the accelerometer arrangement 124 is used. Here the processor 102 monitors signals provided by the accelerometer sensor and processes the signals to determine that the terminal 100 is being moved in a manner that is consistent with the user moving the terminal 100 from a position against the user's ear to a position in front of the user. Typically, this involves detecting movement of the terminal 100 initially sidewards relative to the body of the terminal 100 and then rotating about the vertical axis of the body.

In another alternative, the terminal 100 detects that it is being moved away from the user's ear by detecting that a tag or transducer either forming part of the terminal 100 or being worn on the wrist of a user is moving away from a wearable computer in the form of spectacles or glasses that are being worn by the user. This can provide suitable detection of the speaker 121 being moved away from the user's ear because the terminal 100 and the user's wrist typically are located quite close to the spectacles or glasses when the user is engaged in a phone call, and because the distance increases as the user moves the terminal 100 away from their ear to a position a reading distance in front of the face of the user.

In a further alternative, the processor 102 is configured to analyse signals provided by a forward-facing camera that is located within the terminal 100, and by processing images provided by the camera to determine whether the terminal 100 is being moved away from the user's ear.

Figure 2:
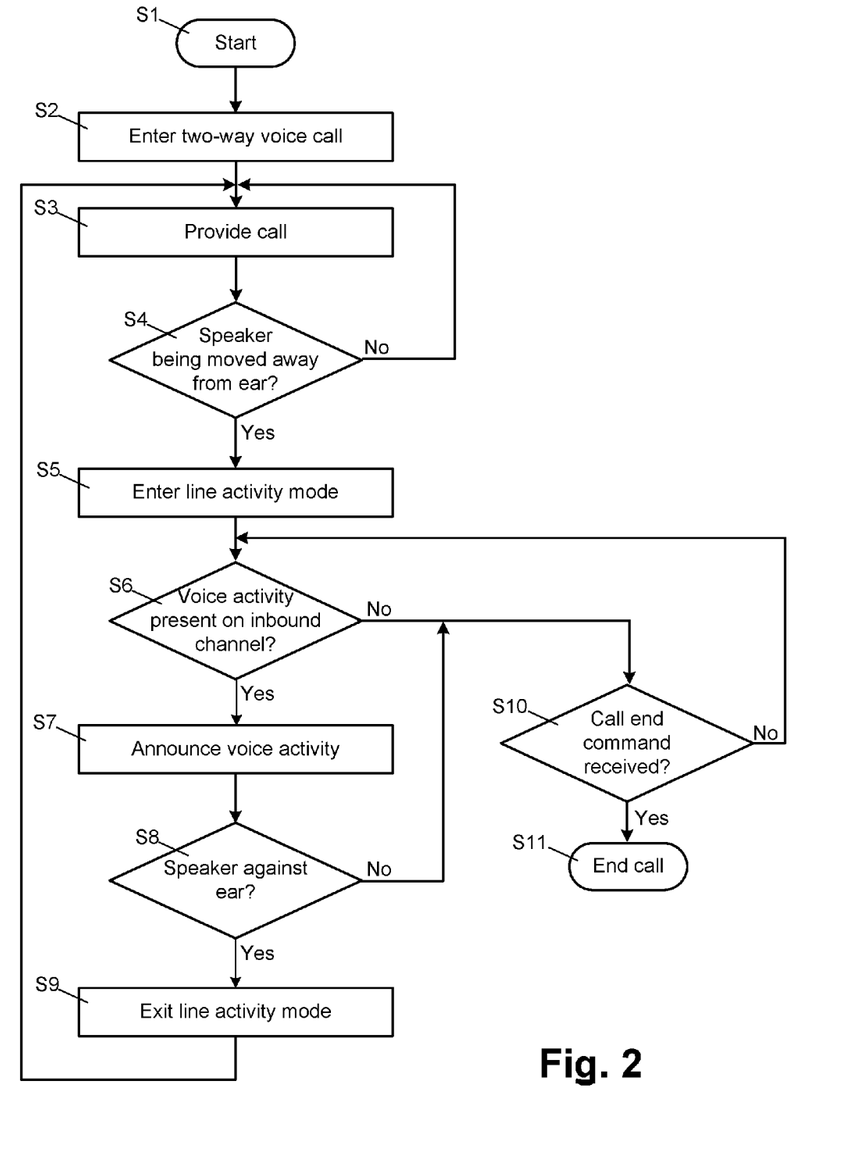
FIG. 2 is a flowchart illustrating exemplary operation of the terminal.

The step of determining whether the speaker is again against the user's ear at step S8 of FIG. 2 can be determined in a similar way, although of course the conditions are reversed.

A number of options for determining whether voice activity is present on the inbound channel, which is step S6 of FIG. 2 will now be described.

In a first option, the processor 102 is configured to determine whether a volume level of audio content on the inbound channel exceeds the threshold. The audio level may in this case be averaged out over a period of time, for instance 0.2 seconds, so as to avoid short duration sounds triggering an announcement of voice activity at step S7. Alternatively, the processor 102 may be configured to isolate voice content of audio signals present on the inbound channel and to determine whether the voice content of the audio signals exceed a threshold. Again, the audio content may be averaged over a period of time, which is preferably a short duration. In the first option, the threshold may be set depending on the background sound level on the inbound channel For instance, the threshold may be higher for a higher average sound level on the inbound channel, or the last portion of the call on the inbound channel The threshold may be higher alternatively for a lower voice to background noise content ratio. In this way, the incorrect triggering of an announcement when there is a high level of background noise on the inbound channel can be avoided.

In a further alternative, the speech analysis application 111 is configured to detect speech content present on the audio signal on the inbound channel and to interpret what words the other party to the call is saying. Here, the processor 102 may be configured to determine whether the other party is using one of a number of predetermined words or phrases that are indicative that the other user wishes to continue the call. Such phrases include "are you still there?", "wait a minute", "don't hang up", etc. This is particularly advantageous since it prevents an announcement of voice activity being provided where there is significant background noise that would otherwise falsely trigger the announcement.

It will be appreciated that the above described embodiments are purely illustrative and are not limiting on the scope of the claims. Other variations and modifications will be apparent to persons skilled in the art upon reading the present application, and some will now be described.

In the above, the announcement to the user is provided as a tactile output (using the haptic transducer) and/or as a visual output, using the display 112. In other embodiments, the announcement may be made by way of an audio output. For instance, the announcement may be made as a tone or alert sound using the speaker 121 or another speaker, for instance an IHF (integrated hands free) speaker. This audio alert may be made in addition to or alternatively to a tactile output and/or a visual output.

Multiple cues may be used to determine whether the speaker 121 is being moved away from the user's ear. For instance, the accelerometer arrangement 124 may be used in combination with the proximity sensor arrangement 122 and/or the touch screen arrangement 114 to determine whether the speaker 121 is being moved away from the user's ear. Using multiple sensors 122, 124, 114 may allow the determination to be made more reliably.

Alternatively or additionally the announcement may be made using a device that is external to the terminal 100. For instance, the announcement may be made using a wearable device such as a bracelet with an output transducer or on a display of a wearable computer in the form of glasses or spectacles. In these embodiments, the terminal 100 causes the announcement to be made by sending instructions in signalling to the external device, thereby causing the external device to make the announcement.

In the above, the terminal 100 is a mobile phone or smart phone. The terminal 100 has a single housing, that is it is a terminal of the type known as candy bar, clam shell or folding phone. In the case of a clam shell or folding phone, there are two sub housings, but the sub housings are permanently fixed to one another by a direct, mechanical and inflexible (in at least one axis) link.

In other embodiments, the terminal 100 is a system including a mobile phone or smart phone and an accessory device. For instance, the terminal 100 may be a mobile phone connected by a Bluetooth (or other wireless) link to a headset, where the headset includes a speaker 121 and may also include a microphone 120. In these embodiments, step S4 of FIG. 2 involves detecting whether the speaker 121 of the headset is being moved away from the ear of the user. Here, the announcement of voice activity on the inbound channel at step S7 may be provided on the mobile phone or it may be provided on the headset, for instance as a haptic announcement.

In other embodiments, the terminal 100 is a fixed line phone, that is it is not a portable phone, and the speaker 121 and maybe also the microphone 120 are provided on a handset that is connected to a phone by a wire or in a wireless manner. In this embodiment, detecting at step S4 whether the speaker is being moved away from the ear involves detecting whether the speaker of the handset is being moved away from the user's ear. The announcement of voice activity may be provided through the fixed phone, or it may be provided through the handset, for instance a haptic announcement.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. An apparatus having at least one processor and at least one memory having computer-readable code stored thereon which when executed controls the at least one processor to perform a method comprising:

while providing two-way communication in a voice call, detecting whether a speaker component of a voice communications device is in a state of being moved away from a user's ear;

in response to detecting that the speaker component of the voice communications device is in a state of being moved away from a user's ear, entering a line activity mode;

in the line activity mode, determining whether voice activity is present on the inbound channel of the voice call, wherein determining whether voice activity is present on the inbound channel of the voice call is performed by speech analysis on speech content on the inbound channel and determining that a predetermined phrase is present; and in response to determining the presence of voice activity on the inbound channel of the call when in the line activity mode, causing announcement of the detection of voice activity.

2. The apparatus as claimed in claim 1, wherein the computer-readable code when executed controls the at least one processor to perform:

causing the announcement of the detection of voice activity by causing display of a warning message indicating the presence of voice activity on the inbound channel of the voice call by causing a haptic announcement to be made.

3. The apparatus as claimed in claim 1, wherein the computer-readable code when executed controls the at least one processor to perform:

detecting whether the speaker component of the voice communications device is in the state of being moved away from the user's ear by detecting an amount of movement exceeding a threshold amount, by analyzing signals provided by a proximity sensor arrangement, by analyzing signals provided by accelerometer arrangement, by analyzing signals provided by a touch screen arrangement, by analyzing signals provided by a hover-sensitive touch screen arrangement, or a combination thereof.

4. The apparatus as claimed in claim 1, wherein the apparatus comprises the voice communications device.

5. The apparatus as claimed in claim 4, wherein the voice communications device comprises a portable voice communications device.

6. The apparatus as claimed in claim 4, wherein the voice communications device comprises a portable voice communications device comprising only one housing.

7. A method comprising:

while providing two-way communication in a voice call, detecting whether a speaker component of a voice communications device is in a state of being moved away from a user's ear;

in response to detecting that the speaker component of the voice communications device is in a state of being moved away from a user's ear, entering a line activity mode;

in the line activity mode, determining whether voice activity is present on the inbound channel of the voice call, wherein determining whether voice activity is present on the inbound channel of the voice call is performed by speech analysis on speech content on the inbound channel and determining that a predetermined phrase is present; and in response to determining the presence of voice activity on the inbound channel of the call when in the line activity mode, causing announcement of the detection of voice activity.

8. A method as claimed in claim 7, comprising: causing announcement of the detection of voice activity by causing display of a warning message indicating the presence of voice activity on the inbound channel of the voice call by causing a haptic announcement to be made.

9. A method as claimed in claim 7, comprising: detecting whether the speaker component of the voice communications device is in the state of being moved away from the user's ear by detecting an amount of movement exceeding a threshold amount, by analyzing signals provided by a proximity sensor arrangement, by analyzing signals provided by accelerometer arrangement, by analyzing signals provided by a touch screen arrangement, by analyzing signals provided by a hover-sensitive touch screen arrangement, or a combination thereof.

10. A method as claimed in claim 7, performed by the voice communications device.

11. A method as claimed in claim 10, wherein the voice communications device comprises a portable voice communications device.

12. A method as claimed in claim 10, wherein the voice communications device comprises a portable voice communications device comprising only one housing.

13. A non-transitory computer-readable storage medium having stored thereon computer-readable code, which, when executed by computing apparatus, causes the computing apparatus to perform a method comprising:

while providing two-way communication in a voice call, detecting whether a speaker component of a voice communications device is in a state of being moved away from a user's ear;

in response to detecting that the speaker component of the voice communications device is in a state of being moved away from a user's ear, entering a line activity mode;

in the line activity mode, determining whether voice activity is present on the inbound channel of the voice call, wherein determining whether voice activity is present on the inbound channel of the voice call is performed by speech analysis on speech content on the inbound channel and determining that a predetermined phrase is present; and in response to determining the presence of voice activity on the inbound channel of the call when in the line activity mode, causing announcement of the detection of voice activity.

14. A non-transitory computer-readable storage medium as claimed in claim 13, wherein the computer-readable code when executed causes the computing apparatus to perform:

causing announcement of the detection of voice activity by causing display of a warning message indicating the presence of voice activity on the inbound channel of the call by causing a haptic announcement to be made.

15. A non-transitory computer-readable storage medium as claimed in claim 13, wherein the computer-readable code when executed causes the computing apparatus to perform:

detecting whether the speaker component of the voice communications device is in the state of being moved away from the user's ear by detecting an amount of movement exceeding a threshold amount, by analyzing signals provided by a proximity sensor arrangement, by analyzing signals provided by accelerometer arrangement, by analyzing signals provided by a touch screen arrangement, by analyzing signals provided by a hover-sensitive touch screen arrangement, or a combination thereof.

16. A non-transitory computer-readable storage medium as claimed in claim 13, wherein the computing apparatus comprises the voice communications device.

17. A non-transitory computer-readable storage medium as claimed in claim 16, wherein the voice communications device comprises a portable voice communications device or a portable communications device comprising only one housing.

* * * * *